Nov. 18, 1930.  H. H. HENNING  1,782,069
ELECTRIC HEATING APPARATUS FOR LIQUIDS
Filed Nov. 17, 1928  3 Sheets-Sheet 1

H. H. Henning
INVENTOR

By: Marks & Clerk
Attys.

Nov. 18, 1930.   H. H. HENNING   1,782,069
ELECTRIC HEATING APPARATUS FOR LIQUIDS
Filed Nov. 17, 1928   3 Sheets-Sheet 2

H. H. Henning
INVENTOR

By Marks & Clerk
Attys.

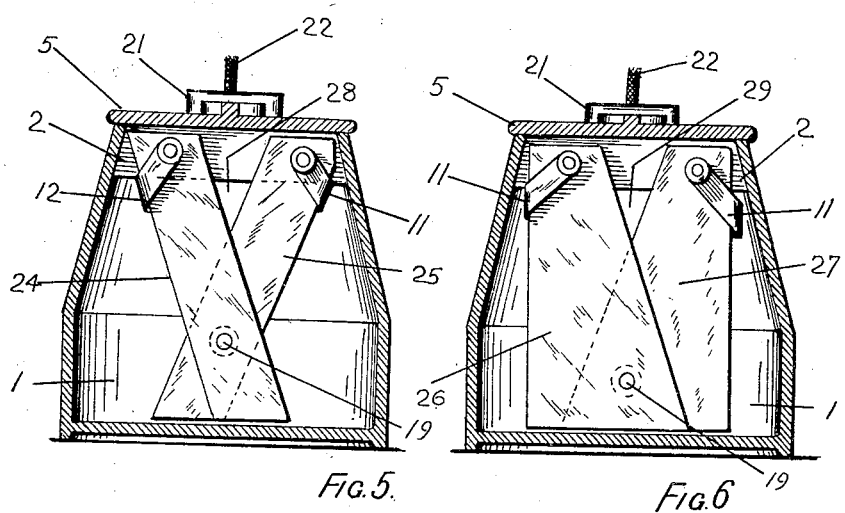
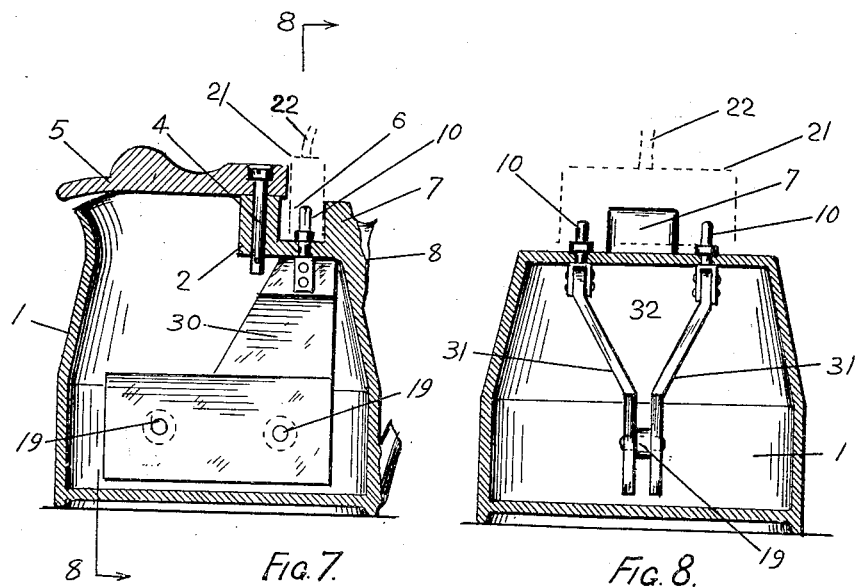

Patented Nov. 18, 1930

1,782,069

UNITED STATES PATENT OFFICE

HENRY HERBERT HENNING, OF PYMBLE, NEAR SYDNEY, NEW SOUTH WALES, AUSTRALIA

ELECTRIC HEATING APPARATUS FOR LIQUIDS

Application filed November 17, 1928, Serial No. 320,162, and in Australia February 2, 1928.

This invention relates to electric heating apparatus for water or other liquids.

One object of the invention is to provide electric heating apparatus for water or other liquids, such apparatus comprising a jug or like receptacle of electric insulating material, the receptacle having a recess to receive electric conductive means on electric conductive terminals associated with said recess, and the lid of the jug being incapable of being opened from the receptacle while the said means are attached to such terminals.

Another object of the invention is to construct the said recess in the said receptacle to permit any water or moisture which may gain access thereto to flow therefrom.

A further object of the invention is to furnish electrodes in the receptacle in association with the terminals whereby the heat for heating water in the receptacle will be concentrated in the receptacle in a position in relation to said electrodes.

Figure 1:
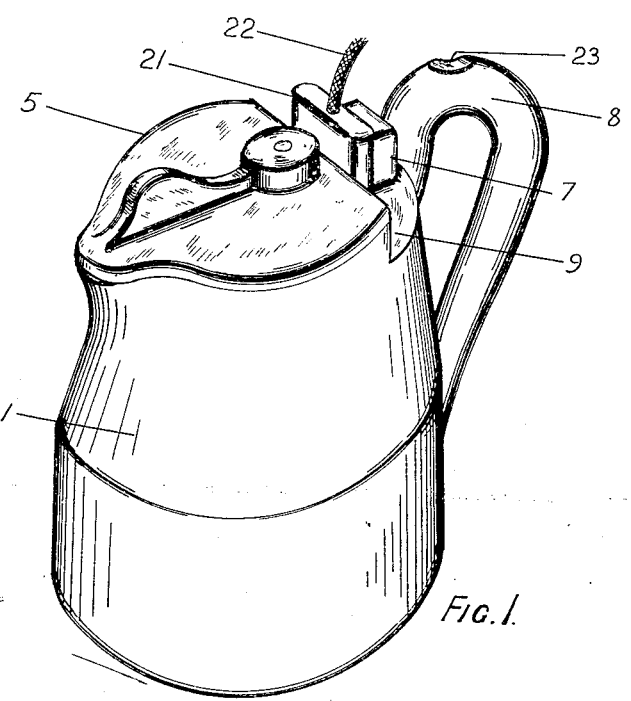
Figure 2:
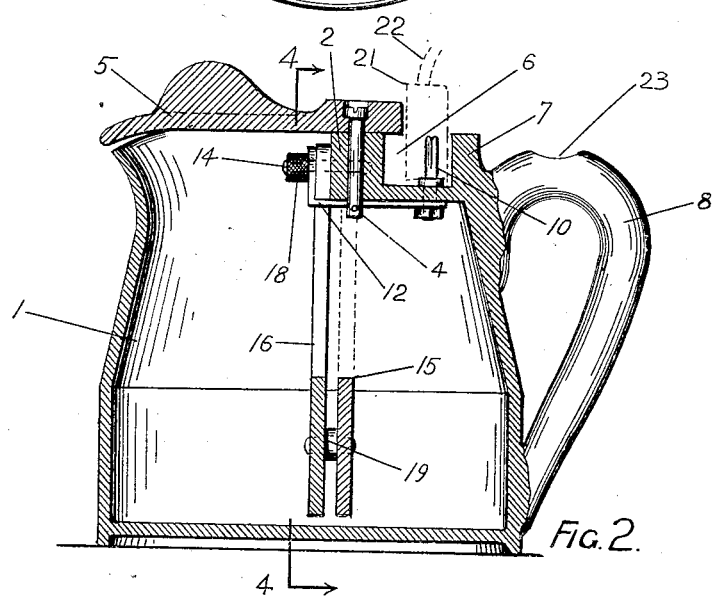
Figure 3:
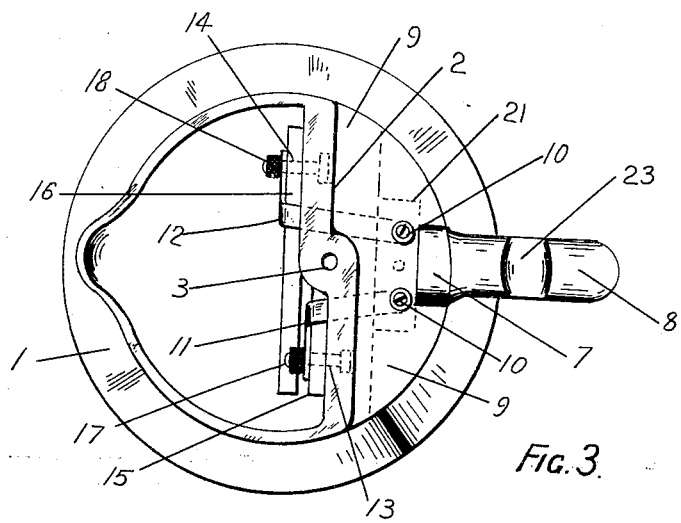
Figure 4:
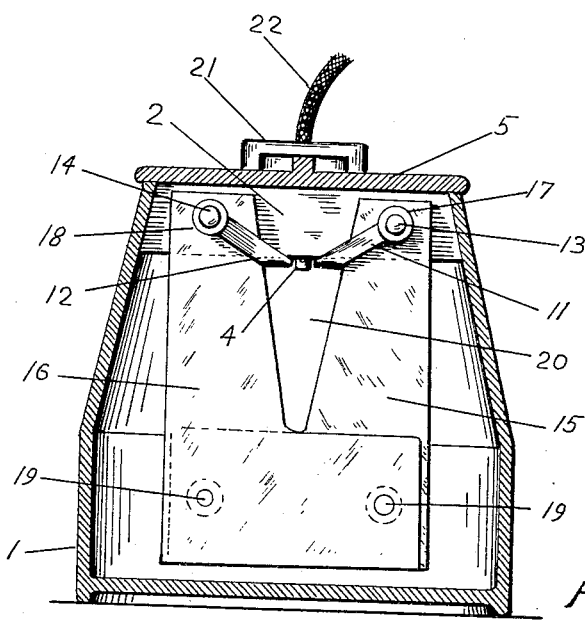

The invention is illustrated in the accompanying drawings, in which Fig. 1 is a perspective view of a heating receptacle with electric conductive means attached thereto and with the lid of the receptacle in closed position; Fig. 2 sectional elevation view; Fig. 3 plan with lid removed; Fig. 4 cross-sectional view on line 4—4, Fig. 2; Figs. 5 and 6 views illustrating modified constructions of electrodes; Fig. 7 a view showing alternative construction for attachment of electrodes to plug terminals; and Fig. 8 a sectional elevation on line 8—8, Fig. 7.

With reference to Figs. 1 to 4, the receptacle 1 is of jug formation and is constructed of electrical insulating material; its design may be of any suitable pattern, but a bridge 2 is provided transversely therein, and such bridge has an opening 3 to receive a pivotal pin 4 for a lid 5.

Said bridge forms a front wall for a recess 6 whose rear wall 7 is formed by one end of the handle 8 which extends from the body of the receptacle 1. The recess 6 is open-sided as at 9 to allow any water or moisture which may gain access to the recess to readily flow therefrom. Associated with the recess and projecting upwardly therein and secured to the bottom thereof is a pair of electric conductive split terminals 10; the separate terminals 10 are adapted to have connected thereto one end of metal plates 11 and 12 respectively whose other ends are connected to bolts 13 and 14 respectively carrying the separate electrodes 15 and 16, the bolts 13 and 14 being secured to the bridge 2 by the respective nuts 17 and 18.

Such electrodes 15 and 16 may be constructed of carbon and they may be made approximately L-shaped so that the horizontal members thereof when the electrodes 15 and 16 are assembled in the receptacle 1 will lie in the same plane and be near and opposite to each other though not in contact with each other. Electric insulating distance pieces 19 may be associated with the electrodes 15 and 16 to keep them separated from each other.

When assembled in the receptacle 1 the horizontal members of the electrodes 15 and 16 will be located towards the bottom of the receptacle 1 and the vertical arms of the said electrodes will have an approximately V-space 20 between them.

An electric coupling 21 of suitable type may be connected at will to the terminals 10, but when such coupling 21 is so connected it is not possible to open the lid 5 from the receptacle 1 by turning it on its pivotal pin 4. Electric lead wires 22 attached to the coupling 21 serve to conduct current from a suitable source to the said coupling and from thence through the terminals 10 to the metal plates 11 and 12 from whence current may pass through the electrodes 15 and 16. Upon current so passing liquid carried in the receptacle 1 to be heated therein serves to complete the electrical circuit between the electrodes 15 and 16.

To obviate short circuiting of current the recess 6 is open-sided to prevent any water or moisture gaining access thereto collecting therein; such water or moisture may flow through such open sides. If required the handle may be furnished with a recess 23 to serve as a grip for the finger of a person.

Instead of constructing the electrodes 15 and 16 to approximately L-shape, they may be made as shown in Fig. 5 or Fig. 6. In Fig. 5 the electrodes 24 and 25 are approximately rectangular but they are disposed cross-wise in the receptacle 1, while in Fig. 6 the electrodes 26 and 27 are of wedge shape and they are disposed in the receptacle 1 in a manner that portions thereof overlap one another. By such arrangement of the respective pairs of electrodes 24 and 25 and 26 and 27 V-shaped spaces 28 and 29 are provided between the respective pairs of such electrodes when they are arranged within the receptacle 1.

In Figs. 7 and 8 the electrodes 30 and 31 are formed to be directly connected to the terminals 10, but the construction of such electrodes is such that a V-space 32 will be provided between the electrodes 30 and 31 when they are assembled in relation to the terminals 10 and within the receptacle 1.

Through disposing the electrodes above described in the receptacle 1, so that portion of them will overlap and be near each other, it is ensured that heating qualifications of the pairs of electrodes will be concentrated above such overlap portions, whereby liquid in the receptacle 1 about such overlapping portions will receive the greatest amount of heat generated when current is passed to the separate pairs of electrodes.

What I claim as my invention and desire to secure by Letters Patent is:—

1. Electric heating apparatus for liquids comprising an electrically insulated receptacle for the liquids, a lid for said receptacle openable horizontally from the mouth of such receptacle, a recess in the head of such receptacle rearwardly of such lid, electric conductive means associated with said recess to which an electric current conducting coupling is attachable to prevent opening of the lid from the receptacle when the coupling is so attached, and electrodes associated with said electric conductive means and located in the said receptacle, the electric circuit of which is only completable through liquid contained in said receptacle.

2. Electric heating apparatus according to claim 1, in which the recess in the receptacle is open-sided to permit liquid gaining access thereto to flow through such open sides.

3. Electric heating apparatus according to claim 1 in which the receptacle has a transverse bridge which forms the front wall of the recess and such bridge has an opening to receive a pivotal pin for the lid.

4. Electric heating apparatus for liquids in which an electrically insulated receptacle is provided for the liquid to be heated therein, the said receptacle having means associated therewith whereby electric current can be conveyed to a pair of electrodes located within the receptacle and separated from each other but disposed in relation to each other so that liquid in the receptacle serves to complete the electric circuit of the electrodes, the electrodes being assembled within the receptacle whereby about their lower portions the pair of electrodes will overlap to provide a V-shaped space between the said electrodes above said overlapped portions thereof.

5. Electric heating apparatus according to claim 4, in which the electrodes are approximately L-shaped, and the horizontal members thereof overlap and are near each other when the electrodes are assembled in the receptacle while the vertical members have a space between their oppositely disposed edges.

6. In and for electric heating apparatus for liquids, a hollow receptacle constructed of electrical insulating material, such receptacle being adapted to have a lid fitted thereto to be opened horizontally in relation to the mouth thereof, and an open-sided recess in the head of such receptacle rearwardly of the said lid, the said recess having a bottom wall with which electric conductive elements are associable.

In testimony whereof I affix my signature.
HENRY HERBERT HENNING.